May 23, 1961

N. WAIL 2,985,012

MEANS FOR CORRECTING ERRORS IN A PRESSURE
PROBE UNDER SUPERSONIC FLIGHT CONDITIONS

Filed Feb. 9, 1959

INVENTOR.
NORMAN WAIL
BY Herbert L. Davis
ATTORNEY

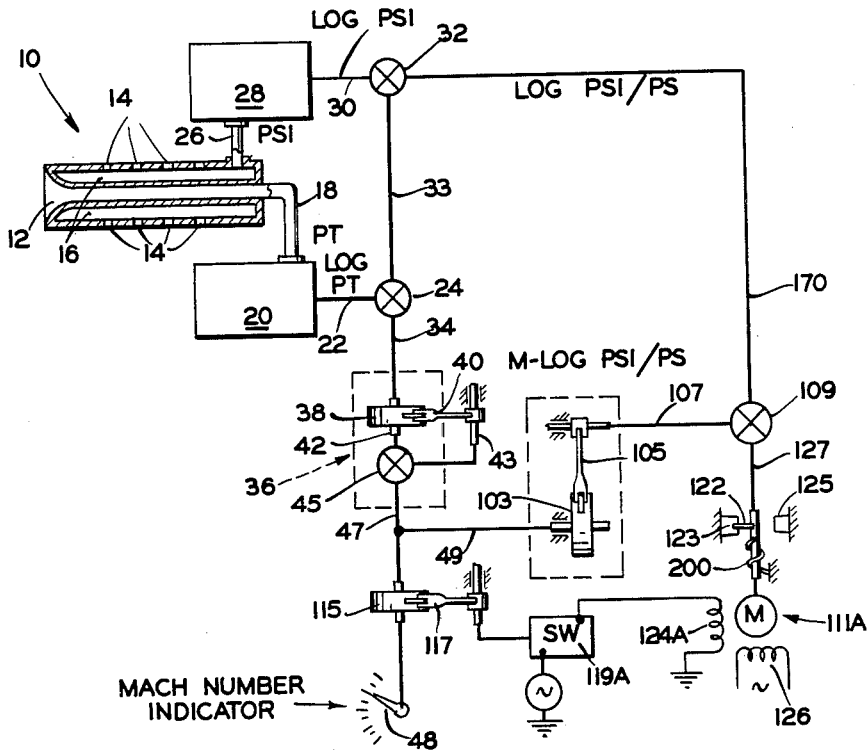
FIG. 2
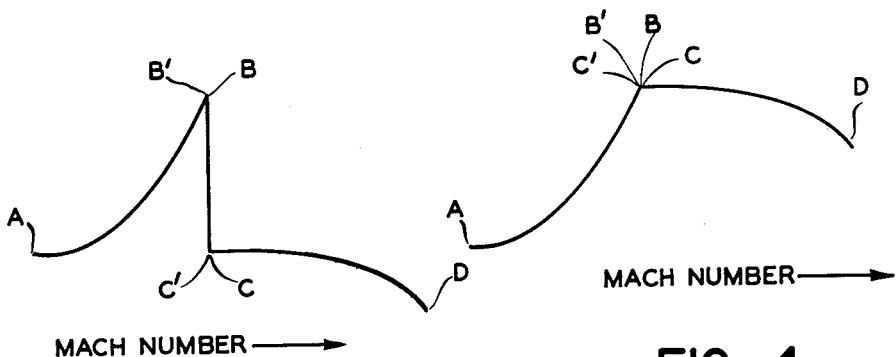
FIG. 3
FIG. 4
INVENTOR.
NORMAN WAIL
BY Herbert L. Harris
ATTORNEY United States Patent Office 2,985,012
Patented May 23, 1961

2,985,012

MEANS FOR CORRECTING ERRORS IN A PRESSURE PROBE UNDER SUPERSONIC FLIGHT CONDITIONS

Norman Wail, Ridgefield, N.J., assignor to The Bendix Corporation, a corporation of Delaware Filed Feb. 9, 1959, Ser. No. 729,171

7 Claims. (Cl. 73—182)

The invention relates to means for correcting errors in the pressures sensed by a pressure probe under flight conditions at supersonic speeds and more particularly to the use in air data computers of novel means for correcting errors in the sensing of static atmospheric pressure by a pitot tube due to turbulences at high speeds of flight of an aircraft and under which conditions as the speed of the aircraft increases there is an increase due to such turbulence in the static pressure as sensed by the pitot tube until, as the speed of the aircraft passes through the sound barrier, there is a sharp drop in the sensed static pressure and thereafter as the speed of the aircraft increases further there is a change in the static atmospheric pressure as sensed through the pitot tube.

The means heretofore used for correcting for those errors encountered in the sensed static atmospheric pressure at increasing speeds has included some form of cam mechanism to provide the required correction functions to solve the problem at airspeeds below that of the speed of sound. In present day aircraft flying at supersonic speeds, there has been found a sharp drop in the sensed static pressure as soon as the speed of the aircraft passes through the sound barrier so that to provide a correction cam to give the required correction functions at speeds in excess of the speed of sound was found to be impractical to maintain the high degree of accuracies required, because of the steep slope required at the crucial point at which the speed of the plane exceeds that of the speed of sound. Thus, in order to provide a cam to effect the required correction function would mean that the cam be cut with an infinite slope to be traversed by the follower in an infinitesimal time. While attempts have been made to cut a cam approximating this function, it has been found that this could not be done with the required degree of accuracy.

An object of the invention is to provide novel means to provide a correction of the errors in the sensed static pressure probe as a function of Mach number.

Another object of the invention is to provide novel means to effect the desired correction function by providing a cam cut to a predetermined curve and accomplishing the steep portion of the required correction function by utilizing a high speed motor and control means therefor actuated at a required point on the curve as cut in the cam so that the required steep slope correction function is applied by the motor through the output thereof which is added to the output of the cam to provide the desired correction function with the required accuracy.

While several embodiments of the invention have been illustrated and described in detail, it is to be expressly understood that the invention is not limitedl thereto. Various changes may also be made in the design and arrangement of the parts without departing from the spirit and scope of the invention as the same will now be understood by those skilled in the art.

In the drawings:

Figure 2 is a diagrammatic view of a computer system in which there is embodied a modified form of the invention.

Figure 1:
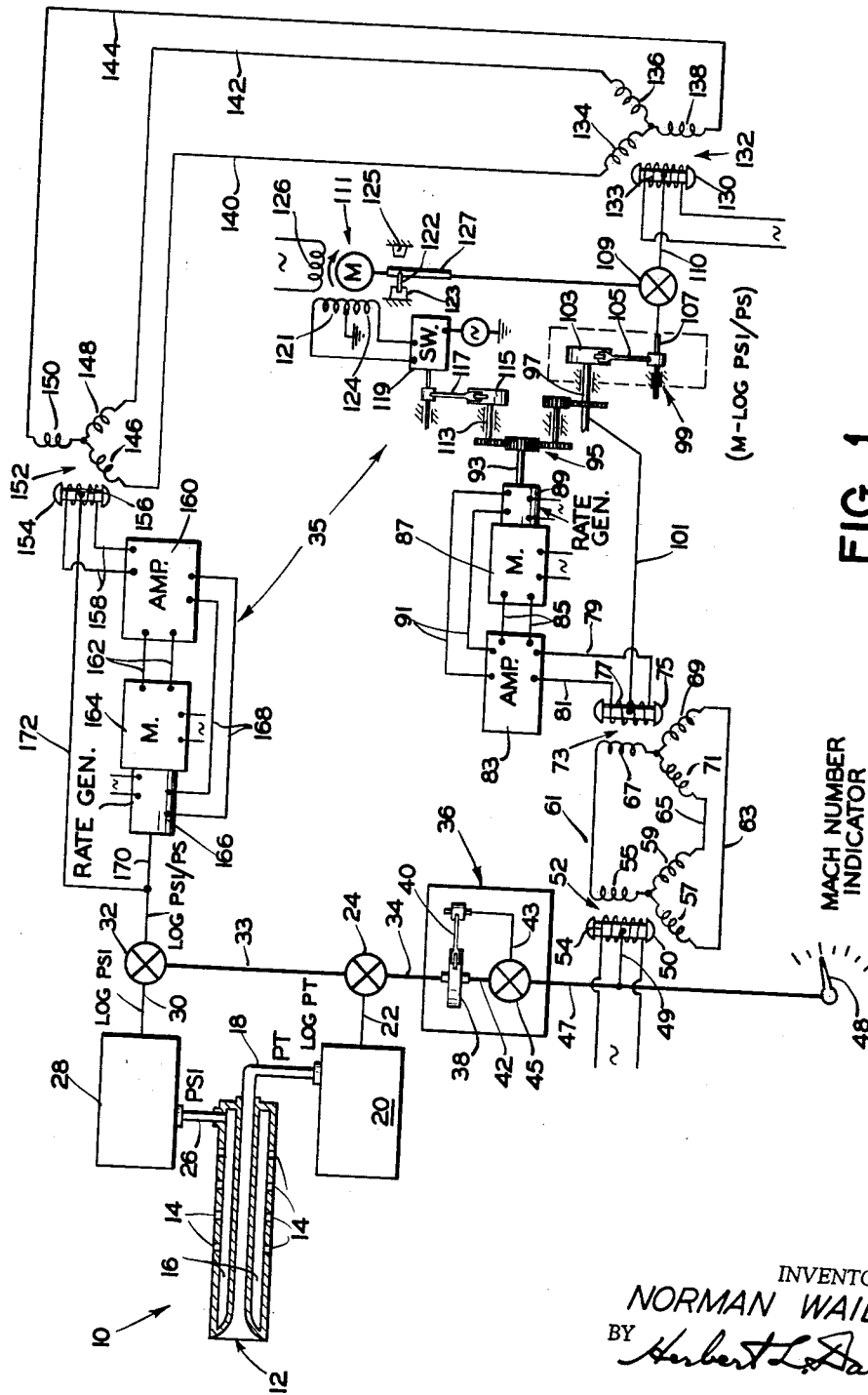
Figure 1 is a diagrammatic showing of a computer system in which one form of the invention is embodied.

Figure 3 is a graphic illustration showing by a line A to B the correction required in the sensed static atmospheric pressure which may exceed the true static atmospheric pressure as the Mach number of the aircraft increases to approximately the speed of sound; further by a line B to C there is shown the correction required as the Mach number of the aircraft passes through the sound barrier; and by a line C to D there is shown the correction required in the sensed static atmospheric pressure which may decrease below the true static atmospheric pressure as the Mach number of the aircraft increases beyond the speed of sound. The required correction will be dependent upon the error characteristics of the particular pressure probe.

Figure 4 is a graphic illustration of the correction function effected by the cam indicated diagrammatically in Figures 1 and 2 by the numeral 103 and in which the required steep correction slope B to C, shown graphically in Figure 3, is put into the cam output by effecting operation of a motor at a point B′ immediately preceding point B so that the motor may differentially drive the output of the cam to effect the required correction functions.

Referring to the drawing of Figure 1, there is indicated generally by the numeral 10 an air pressure probe of conventional type such as a pitot tube which may be in the free air stream and mounted on the airfoil of an aircraft so as to sense through the passage 12 impact or total pressure which increases with the speed of the aircraft and which total pressure is hereinafter indicated by the symbol PT.

The static atmospheric pressure is further sensed through passages 14 in the side of the pitot tube 10 and leading to a passage 16. Due to the effects of turbulence at high speeds of the aircraft, the pressure sensed through the passages 14 and 16 or the indicated pressure varies with the Mach number of the aircraft, as shown graphically in Figure 3. The sensed static atmospheric pressure, or indicated static pressure, is designated hereinafter as pressure PSI while the actual or corrected static atmospheric pressure is designated hereinafter as PS.

As shown in Figure 1, the pressure PT is applied through a conduit 18 to a pressure sensing mechanism 20 which may be of a suitable type such as shown, for example, in U.S. application Serial No. 704,403, now Patent No. 2,945,995, filed December 23, 1957, by Norman Wail and assigned to Bendix Aviation Corporation. In the mechanism 20 there is provided means for driving in response to the sensed pressure PT an output shaft 22 leading to a suitable differential mechanism indicated diagrammatically in Figure 1 by the numeral 24.

This mechanism 20 includes a pressure sensitive diaphragm giving a displacement proportional to the log of its sensed pressure and operating through a servo follow-up mechanism to effect a positioning of the output shaft 22 as a function of the log of its sensed pressure PT.

Further, the pressure PSI sensed in the chamber 16 is applied through a conduit 26 to a suitable pressure sensing mechanism 28 such as, for example, in the U.S. application Serial No. 704,403, now Patent No. 2,945,995.

This mechanism 28 includes a pressure sensitive diaphragm giving a displacement proportional to the log of its sensed pressure and operating through a servo follow-up mechanism to effect a positioning of an output shaft 30 as a function of the log of its sensed pressure PSI.

The mechanism 28 is arranged to drive in response to the sensed pressure PSI the output shaft 30 leading to a suitable differential mechanism 32 which is in turn connected by a shaft 33 to the differential mechanism 24 so that the outputs of the shafts 22 and 33 driven as a function of the log of PT and the log PSI, respectively, are combined at an output shaft 34. There is further applied to the differential mechanism 32 a correction function to readjust the shaft 33 and thereby the shaft 34 for the error between the actual or corrected static atmospheric pressure PS, and the indicated static pressure PSI, as sensed at the mechanism 28. The correction function is applied through a correction function loop mechanism 35, as hereinafter explained.

The output shaft 34 drives a cam mechanism indicated generally by the numeral 36 and including a cam 38 and cam follower 40 for driving shafts 42 and 43 through a suitable differential mechanism 45 so as to effectively actuate an output shaft 47 as a function of Mach number.

The shaft 47 drives a suitable Mach number indicator 48 or other controlled mechanism, not shown, and through a shaft 49 of the correction function mechanism 35, a rotor member 50 of a signal transmitter synchro indicated generally by the numeral 52. The rotor member 50 has a rotor winding 54 of conventional type connected across a suitable source of alternating current and inductively coupled to stator windings 55, 57 and 59 of the synchro 52.

The stator windings 55, 57 and 59 are in turn connected through conductors 61, 63 and 65 to corresponding stator windings 67, 69 and 71 of a signal receiver synchro 73 having a rotor member 75 and a rotor winding 77 inductively coupled to the stator windings 67, 69 and 71. The rotor winding 77 has output conductors 79 and 81 connected to the input of an amplifier 83 of conventional type and having output conductors 85 leading to a reversable two phase motor of conventional type indicated by the numeral 87 driving in turn a conventional rate generator 89 applying an anti-hunting signal through feed-back conductors 91 to the input of the amplifier 83 in a conventional manner.

Motor 87 also drives an output shaft 93 which is connected through a conventional gear train 95 and a shaft 97 to an output correction cam mechanism indicated generally by the numeral 99, which will be hereafter explained, and through the shaft 97 to a follow-up shaft 101 to reposition the rotor number 75 of the synchro 73 to a null position relative to the stator windings 67, 69 and 71 of the synchro 73 so that the rotor member 75 of the signal receiver synchro 73 effectively follows the adjusted position of the rotor member 50 of the signal transmitter synchro 52.

As indicated graphically by Figure 3, the static atmospheric pressure as sensed through the probe 10 varies with the Mach number of the aircraft. In order to correct for this phenomena the output correction cam mechanism 99 includes a cam member 103 and cam follower 105 driving through a shaft 107 a differential mechanism 109 to in turn drive an output shaft 110 so as to provide the correction function, illustrated graphically in Figure 4, required to correct for the errors in the sensed atmospheric pressure at aircraft speeds below the speed of sound and to effect in part the required correction function at speeds in excess of the speed of sound in cooperation with other mechanism hereinafter described.

In aircraft flight, there exists a problem in the correcting of those errors in the pressure probe due to difference between the sensed indicated pressure PSI and the actual or corrected static atmospheric pressure PS. This correction is usually accomplished with a knowledge of the errors as a function of Mach number and correcting the errors by some means in a computer. The means of correcting these errors at aircraft speeds below supersonic speeds is usually done by having a cam surface cut to provide the required corrective function. In the transition to supersonic speeds, however, there is encountered many problems in the cutting of the cam to provide the required corrective function, since in the present day aircraft flying at supersonic speeds, there is encountered a sharp drop in the sensed indicated static pressure PSI as soon as the aircraft passes through the sound barrier. The required correction function at speeds above and below that of the speed of sound is shown graphically in Figure 3.

It will be seen then that in order to cut the correction cam 103 so as to provide the required correction function to meet the conditions, shown in Figure 3, for aircraft speeds both below and above the speed of sound would be practically impossible as the cam must necessarily have some errors in it, because of the steep slope (drop in function), as shown in Figure 3. Thus, to cut the cam so as to provide the required correction function, shown in Figure 3, would require that the cam 103 be cut with an infinite slope to be traversed by the follower 105 in an infinitesimal time. Moreover, attempts to cut a cam 103 so as to approximate this function have heretofore not been done with any degree of accuracy.

In order to provide the desired function with the required accuracy, the novel means herein disclosed has been devised wherein the cam 103 has been cut, as shown in Figure 4, while the step portion of the required correction function, shown in Figure 3 is accomplished by utilizing a reversable "flip-flop" motor indicated generally by the numeral 111 and actuated at the required point B' of Figures 3 and 4 so that a "step input" is added algebraically at the differential mechanism 109 to the output from the shaft 107 so as to provide the required correction function B—C of Figure 3 to the output shaft 110 of the differential mechanism 109.

As shown in the drawing of Figure 1, the motor 87 further drives through the gear train 95, a shaft 113 and thereby a switch control cam 115 in timed relation with the cam 103. The switch control cam 115 is arranged so as to effect through a cam follower 117 actuation of a switch mechanism 119 at a point corresponding to that of point B', shown in Figures 3 and 4. The point B' immediately precedes the point B corresponding to that at which the speed of the aircraft exceeds the speed of sound. Thus, at a point corresponding to the point B', the controlling cam 115 causes actuation of the switch 119 in a sense to effectively deenergize a motor control winding 121 normally holding stop 122 of the motor 111 in engaging relation with stop 123 and effect energization of an opposite motor control winding 124 so as to cause rotation of the motor 111 and stop 122 from engaging relation with stop 123 into engaging relation with a stop 125 at the opposite limit of movement of motor 111 in a clockwise direction, as shown in Figure 1. The controlling cam 115 retains the switch 119 in the last-mentioned adjusted position so long as the speed of the aircraft exceeds that of the speed of sound.

As shown in Figure 1, the motor 111 includes the selectively energized control windings 121 and 124 and a fixed phase winding 126 so that upon the actuation of the switch 119 so as to effect the energization of the motor control winding 124, there results a rotation of the motor 111 in a sense to drive through motor output shaft 127 a differential mechanism 109 and thereby the output shaft 110 so as to provide the required correction function indicated from B to C of Figure 3, upon the speed of the aircraft exceeding the speed of sound.

The output shaft 110 is in turn operatively connected to a rotor element 130 of a signal transmitter synchro 132. The rotor element 130 has a winding 133 energized from a suitable source of alternating current and inductively coupled to stator windings 134, 136 and 138 of the synchro 132. The stator windings 134, 136 and 138 are in turn connected by conductors 140, 142 and 144 to stator windings 146, 148 and 150 of a signal receiver synchro 152 having a rotor element 154 with winding 156 to which stator windings 146, 148 and 150 are inductively coupled.

The rotor winding 156 has output conductors 158 leading to the input of an amplifier 160 of conventional type and including output conductors 162 leading to a suitable servo motor 164 in turn driving a conventional rate generator 166 applying an anti-hunting signal through feedback conductors 168 to the input of the amplifier 160 in a conventional manner.

The motor 164 drives through an output shaft 170 a follow-up shaft 172 to position the rotor element 154 of the synchro 152 to a null position so that the rotor element 154 of the signal receiver synchro 152 follows the adjusted position of the rotor element 130 of the signal transmitter synchro 132. The shaft 170 is drivingly connected to the differential mechanism 32 so as to correct the adjusted position of the shaft 33 for the initial error arising due to the positioning of the shaft 30 in response to the sensed static atmospheric pressure PSI at the prevailing Mach number of the aircraft, as distinguished from the corrected or actual static atmospheric pressure PS.

From the foregoing it will be seen that the required portion of the required correction function of Figure 3 labeled A to B is obtained from the cam 103 having a cam surface to provide the function A to B, as shown in Figure 4. Moreover, at the instant that the gear train 95 has positioned the function cam 103 relative to the cam follower 105 to a point B' (Figure 4), the switch actuating cam 115 actuates the switch 119 so as to transfer the energization of the motor control windings from winding 121 to 124 so as to cause the motor 111 to rotate in a clockwise direction as indicated by the arrow in Figure 1 and cause the motor stop 122 to rotate from engaging relation with stop 123 to engagement with the stop 125. The latter rotation of the motor 111 is algebraically added at the differential mechanism 109 so as to cause a readjustment and reverse movement of the output shaft 110 to reposition the rotor 130 of the signal transmitter synchro 132 and causing a change in the correction function applied thereby equivalent to going from point B to point C of Figure 3. Further, to advance from a point C to point D in Figure 3 is effected by the cam 103 being cut to a configuration to provide the function C to D, as shown in Figure 4.

Moreover, it will be seen that as the speed of the aircraft reaches the point B' of Figures 3 and 4 immediately preceding the sound barrier point B and proceeds through the sound barrier the pressure PT will be increasing while the pressure PSI will be increasing up to the point B and thereafter as the speed of the aircraft passes through the sound barrier the last-mentioned sensed pressure PSI will sharply drop as indicated by the line B to C of Figure 3. The correction function applied at the differential mechanism 32 at point B' momentarily acts in a Mach number increasing sense furthering the effect of the switch control cam 115 in the operation of the control switch 119 to bring into effect the correction effect applied by the motor 111. Thereafter the control effect from the points C to D of Figure 4 is an operation to correct for the drop in the sensed pressure from points C to D of Figure 3 so long as the speed of the aircraft is above that of the speed of sound.

Upon the speed of the aircraft decreasing in an opposite sense from a speed in excess of the speed of sound to a speed below the sound barrier there is effected a reversal of the previous operation. Thus upon the adjustment of the cam 103 to a point C' relative to the cam follower 105 and immediately after the point C, there is effected a reverse operation of the switch mechanism 119 by the switch control cam 115 causing a transfer of the energization of the motor control windings from winding 124 to winding 121. Upon energization of the winding 121 the motor 111 is rotated in a reverse counter-clockwise direction causing stop 122 to disengage the stop 125 and the reengagement of the stop 122 with stop 123 at the limit of its movement. The latter action of the motor 111 effects a reverse rotation of the shaft 127 in a sense to effectively add to the shaft 110 at the differential mechanism 109 a correction function equivalent to going from point C to point B of Figure 3 so that thereafter at speeds of the aircraft below the speed of sound an output correction function corresponding to the line B to A is applied depending upon the prevailing speed of the aircraft below that of the speed of sound.

The correction function applied by the cam mechanism 99 and motor 111 through the differential mechanism 109 is in either event applied through the shaft 170 to the differential mechanism 32 so as to readjust the shaft 33 for the corrected ambient atmospheric pressure at the prevailing Mach number of the aircraft.

Thus, those errors in sensed ambient atmospheric pressure at the probe 10 due to turbulent conditions prevailing at airspeeds of the aircraft above or below the speed of sound or as the speed of the aircraft passes through the sound barrier may be effectively corrected to provide a more accurate indication or control effect dependent upon the Mach number of the aircraft.

A modified form of the invention is illustrated in Figure 2 in which corresponding numerals indicate corresponding parts to those described with reference to Figure 1 and in which a motor 111A for applying the correction function may be of the type having a helical spring arrangement 200 biasing the motor stop 122 into engaging relation with stop 123 and in which there may be provided a single motor control winding 124A which is energized upon actuation of a switch mechanism 119A effected by cam 115 and cam follower 117 upon the cam 103 reaching a position relative to the follower 105 corresponding to the point B' of Figures 3 and 4 to cause rotation of motor 111A in the direction to apply a correction function equivalent to going from point B to C of Figure 3. Deenergization of the motor control winding 124A and reverse rotation of motor 111A is effected by spring 200 upon the cam 103 reaching a point corresponding to point C', as explained with reference to Figure 1.

Further, a shaft 170 may be connected directly from the output of the differential mechanism 109 to the input of the differential mechanism 32 so as to apply the required correction function through the output shaft 33, as heretofore described with reference to the mechanism of Figure 1. The operation of the mechanism of Figure 2 is otherwise substantially the same as that described in reference to the device shown diagrammatically in Figure 1 and therefore further explanation of the same is not deemed necessary.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. For use with an air pressure probe positioned in the free air stream of an aircraft during flight of the aircraft at Mach numbers above and below that of the speed of sound; means for correcting for an error in a pressure sensed by the pressure probe, comprising, in combination, a cam having a first cam surface to correct for an error in said sensed pressure at a Mach number of the aircraft below the speed of sound and a second cam surface to correct for an error in said sensed pressure at a Mach number of the aircraft in excess of the speed of sound, means operatively controlled by said pressure probe for adjusting said cam as a function of the Mach number of the aircraft, cam follower means for cooperating with said first and second cam surfaces, operative connecting means driven by said cam follower means for applying a corrective function to the means operatively controlled by said pressure probe, means for applying a step function to the operative connecting means, said step function applying means upon said aircraft attaining a speed of substantially Mach number one being operative by said pressure probe controlled means in such a manner that the corrective function applied by said cam follower means through said operative connecting means may effectively correct for the error in the sensed pressure.

2. The combination defined by claim 1 in which said step function applying means includes motor means for driving said operative connecting means in opposite senses, means selectively operated by the pressure probe controlled means in such a manner as to effect operation of said motor means in one sense upon the Mach number of the aircraft being below the speed of sound and in an opposite sense upon the Mach number of the aircraft exceeding the speed of sound.

3. For use with an air pressure probe including means for sensing total impact air pressure and means for sensing static atmospheric pressure during flight of an aircraft at Mach numbers above and below that of the speed of sound, and which sensed static atmospheric pressure due to the effects of turbulence at high air speeds of the aircraft may differ from that of the true static atmospheric pressure by a predetermined error varying with the Mach number of the aircraft; the combination comprising means responsive to said sensed pressures, means operated by said pressure responsive means having output means adjustably positioned as a function of the Mach number of the aircraft, control means driven by said output means for providing a corrective function variable with the Mach number of the aircraft, means for operably connecting said control means to said pressure responsive means for applying the corrective function thereto, and other means to vary the effect of said connecting means, said other means being operated by said output means in a predetermined timed relation with said control means, said output means being effective upon said aircraft attaining a speed of substantially Mach number one to cause said other means to vary the effect of said connecting means in one sense upon the Mach number of the aircraft increasing above the speed of sound and to cause said other means to vary the effect of said connecting means in another sense upon the Mach number of the aircraft decreasing below the speed of sound.

4. For use with an air pressure probe including means for sensing total impact air pressure and means for sensing static atmospheric pressure during flight of an aircraft at Mach numbers above and below that of the speed of sound, and which sensed static atmospheric pressure due to the effects of turbulence at high air speeds of the aircraft may differ from that of the true static atmospheric pressure by a predetermined error varying with the Mach number of the aircraft; the combination comprising means responsive to said sensed pressures, means operated by said pressure responsive means having output means adjustably positioned as a function of the Mach number of the aircraft, a cam driven by said output means, cam follower means cooperating with said cam for providing a corrective function variable with the Mach number of the aircraft, means for connecting said cam follower means to said pressure responsive means for applying the corrective function thereto, said connecting means including a differential mechanism, motor means operably connected to said differential mechanism to vary the effect of said connecting means, control means for said motor means operable by said output means in a predetermined timed relation with said cam follower means and effective upon the aircraft attaining a speed of substantially Mach number one to cause said motor means to vary the effect of said connecting means in one sense upon the Mach number of the aircraft increasing above the speed of sound and to cause said motor means to vary the effect of said connecting means in another sense upon the Mach number of the aircraft decreasing below the speed of sound.

5. For use with an air pressure probe including means for sensing total impact air pressure and means for sensing static atmospheric pressure during flight of an aircraft at Mach numbers above and below that of theh speed of sound, and which sensed static atmospheric pressure due to the effects of turbulence at high air speeds of the aircraft may differ from that of the true static atmospheric pressure by a predetermined error varying with the Mach number of the aircraft; the combination comprising means responsive to said sensed pressures, means operated by said pressure responsive means having output means adjustably positioned as a function of the Mach number of the aircraft, a cam driven by said output means, said cam having a first cam surface to correct for the error in said sensed static atmospheric pressure at a Mach number of the aircraft below the speed of sound and which sensed pressure exceeds the true static atmospheric pressure, said cam having a second cam surface to correct for an error in said sensed pressure at a Mach number of the aircraft in excess of the speed of sound and which sensed pressure is below the true static atmospheric pressure, cam follower means cooperating with said first and second cam surfaces for providing a corrective function variable with the Mach number of the aircraft, means for operably connecting said cam follower to said pressure responsive means for applying the corrective function thereto, said connecting means including a differential mechanism, motor means operably connected to said differential mechanism to vary the effect of said connecting means, first stop means for limiting the movement of said motor means in a first sense and second stop means for limiting the movement of said motor means in an opposite second sense, switch means for selectively controlling the operation of said motor means in said first and second senses, said switch means being operated by said output means in a predetermined timed relation with said cam follower means so that upon the cam follower means passing from cooperative relation with said first cam surface into cooperative relation with said second cam surface said switch means is selectively operated by said output means so as to cause said motor means to move in said first sense so as to render said connecting means effective in a sense to correct the error in the sensed static pressure upon the Mach number of the aircraft increasing above the speed of sound while upon the cam follower means passing from cooperative relation with said second cam surface into cooperative relation with said first cam surface said switch means is selectively operated by said output means so as to cause said motor means to move in said second sense so as to render said connecting means effective in a sense to correct the error in the sensed static pressure upon the Mach number of the aircraft decreasing below the speed of sound.

6. In a device of the character described, means responsive to a sensed condition differing from a second condition by a predetermined error which varies over first and second ranges of operation of the device, comprising a correction cam having a first cam surface to effectively correct the sensed condition for the error in the first range of operation, said cam having a second cam surface to effectively correct the sensed condition for the error over the second range of operation, cam follower means for cooperating with said first and second cam surfaces, operative connecting means driven by said cam follower means for applying a corrective function to said condition responsive means, said condition responsive means drivingly connected to said correction cam, means for applying a step function to the operative connecting means, and means to operate said cam and step function applying means in timed relation so as to effectively apply said step function to said operative connecting means intermediate said first and second ranges of operation so that said cam follower means in cooperative relation with said first and second cam surfaces may effectively correct the predetermined error in the sensed condition over said ranges of operation.

7. In a device including means responsive to a sensed condition differing from a second condition by a predetermined error which varies over first and second ranges of operation of the device, the combination comprising a correction cam having a first cam surface to effectively correct the sensed condition for the error during the first range of operation, said cam having a second cam surface to effectively correct the sensed condition for the error during the second range of operation, cam follower means for cooperating with said first and second cam surfaces, operative connecting means driven by said cam follower means for applying a corrective function to said condition responsive means, said condition responsive means drivingly connected to said correction cam, motor means for selectively driving said operative connecting means in opposite senses within a predetermined limited range, control means for selectively effecting operation of said motor means in said opposite senses, and means to operate said control means in timed relation with said cam so that upon the cam follower means passing from cooperative relation with said first cam surface into cooperative relation with said second cam surface said motor means drives said operative connecting means in one sense within said predetermined limited range and upon the cam follower means passing from cooperative relation with said second cam surface into cooperative relation with said first cam surface said motor means drives said operative connecting means in an opposite sense within said predetermined limited range, said cam follower means selectively cooperating with said first and second cam surfaces so that the operative connecting means is additionally driven in such a manner as to correct for the predetermined error in the sensed condition over said ranges of operation of the device.

References Cited in the file of this patent

UNITED STATES PATENTS

| | | |
|---|---|---|
| 2,450,884 | Dawson et al. | Oct. 12, 1948 |
| 2,512,790 | Cleveland | June 27, 1950 |
| 2,599,288 | Schaefer | June 3, 1952 |